(12) United States Patent
Denoyer et al.

(10) Patent No.: US 10,797,801 B2
(45) Date of Patent: Oct. 6, 2020

(54) SPLIT OPTICAL FRONT END RECEIVERS

(71) Applicant: Finisar Corporation, Sunnyvale, CA (US)

(72) Inventors: Gilles P. Denoyer, San Jose, CA (US); Dennis Pu, Redwood City, CA (US); Homero Guimaraes, Champaign, IL (US); Faraz Monifi, San Diego, CA (US); Bryan Park, Sunnyvale, CA (US); Daniel Mahgerefteh, Los Angeles, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/157,946

(22) Filed: Oct. 11, 2018

(65) Prior Publication Data

US 2019/0109649 A1 Apr. 11, 2019

Related U.S. Application Data

(60) Provisional application No. 62/652,633, filed on Apr. 4, 2018, provisional application No. 62/570,765, filed on Oct. 11, 2017.

(51) Int. Cl.
*H04B 10/69* (2013.01)
*H04B 10/67* (2013.01)

(52) U.S. Cl.
CPC ........... *H04B 10/671* (2013.01); *H04B 10/69* (2013.01)

(58) Field of Classification Search
CPC .. G02B 2006/12147; G02B 2006/1215; G02B 2006/125; G02B 2006/12061; H04J 14/0204; H04J 14/0205; H04B 10/25; H04B 10/2504; H04B 10/67; H04B 10/69
See application file for complete search history.

(56) References Cited

U.S. PATENT DOCUMENTS

| | | | |
|---|---|---|---|
| 3,866,228 A | 2/1975 | Alford |
| 4,289,373 A | 9/1981 | Sugimoto et al. |
| 5,103,494 A | 4/1992 | Mozer |
| 6,002,823 A | 12/1999 | Chandross et al. |

(Continued)

OTHER PUBLICATIONS

International Search Report and Written Opinion dated Jul. 23, 2019, in related PCT Application No. PCT/US2019/025897.

(Continued)

*Primary Examiner* — Tanya T Motsinger
(74) *Attorney, Agent, or Firm* — Maschoff Brennan

(57) ABSTRACT

An optical receiver with improved dynamic range may include at least one directional coupler having at least one input configured to couple to an optical fiber. The optical receiver may include a first signal path including a first photodetector coupled to an output of the at least one directional coupler, a first transimpedance amplifier (TIA) including an input coupled to the first photodetector, and an adder coupled to an output of the first TIA. The optical receiver may include a second signal path including a second photodetector coupled to an output of the at least one directional coupler, a second TIA including an input coupled to the second photodetector, and the adder coupled to an output of the second TIA. Further, the optical receiver may include an optical power sensing circuit coupled to at least one of the first TIA, the second TIA, and the adder.

19 Claims, 9 Drawing Sheets

(56) References Cited

U.S. PATENT DOCUMENTS

| | | |
|---|---|---|
| 6,594,071 B1 | 7/2003 | Gavrilovic et al. |
| 6,636,669 B1 | 10/2003 | Chin et al. |
| 9,274,274 B1* | 3/2016 | Xu .................... G02B 6/12033 |
| 9,366,818 B1* | 6/2016 | Lin ..................... G02B 6/2773 |
| 2004/0136646 A1* | 7/2004 | Shahar .................. H04J 14/02 385/24 |
| 2004/0151423 A1* | 8/2004 | Izhaky ................ G02B 6/1228 385/21 |
| 2007/0086704 A1* | 4/2007 | Ishikawa ............... G02B 6/125 385/43 |
| 2008/0069565 A1* | 3/2008 | Takahara .................. H04L 7/02 398/79 |
| 2009/0220228 A1 | 9/2009 | Popovic |
| 2009/0279902 A1* | 11/2009 | Granot ................ H04B 10/677 398/208 |
| 2010/0040327 A1* | 2/2010 | Deki .................... G02B 6/1228 385/28 |
| 2010/0290626 A1 | 11/2010 | Jenkins et al. |
| 2011/0133783 A1* | 6/2011 | Glass .................... H03M 1/204 327/72 |
| 2012/0039565 A1 | 2/2012 | Klein et al. |
| 2015/0003782 A1 | 1/2015 | Oka et al. |
| 2015/0349735 A1* | 12/2015 | Reuven .................... H01P 5/18 333/111 |
| 2017/0026011 A1* | 1/2017 | Khaw ....................... H03F 3/08 |
| 2017/0329081 A1* | 11/2017 | Mahgerefteh ........ G02B 6/2726 |
| 2018/0006732 A1* | 1/2018 | Pang .................. H04B 10/6931 |
| 2018/0274926 A1* | 9/2018 | Wang .................... G01C 19/72 |
| 2019/0052370 A1* | 2/2019 | Pang .................. H04B 10/6971 |
| 2019/0109649 A1* | 4/2019 | Denoyer ............... H04B 10/671 |
| 2019/0229813 A1 | 7/2019 | Monifi et al. |

OTHER PUBLICATIONS

Non-Final Office Action in U.S. Appl. No. 16/373,847 dated Apr. 14, 2020.

* cited by examiner

| Parameter | Value |
|---|---|
| W | 740nm |
| Gap | 450nm |
| dx, dy | 20um, 3um |
| L | 2.8um |
| T | 600nm |

(A)

(B)

(C)

SPLIT OPTICAL FRONT END RECEIVERS

CROSS-REFERENCE TO RELATED APPLICATION

This application claims the benefit of and priority to U.S. Provisional App. No. 62/570,765, filed Oct. 11, 2017, and U.S. Provisional App. No. 62/652,633, filed Apr. 4, 2018. The 62/570,765 application and the 62/652,633 application are incorporated herein by reference.

FIELD

The embodiments discussed herein relate to split optical front end receivers.

BACKGROUND

Unless otherwise indicated herein, the materials described herein are not prior art to the claims in the present application and are not admitted to be prior art by inclusion in this section.

Fiber optics and optoelectronics are important aspects of modern optical networks because they allow for efficient and accurate transmission of optical data between various components in a network system. An optical transceiver module ("transceiver"), which may include an optical receiver, is an example of a modular component that is used in optical networks.

The subject matter claimed herein is not limited to implementations that solve any disadvantages or that operate only in environments such as those described above. Rather, this background is only provided to illustrate one example technology area where some implementations described herein may be practiced.

SUMMARY

Some embodiments discussed herein are related to split optical front end receivers.

In an example embodiment, an optical receiver system includes an optical receiver that includes a directional coupler, a first signal path, a second signal path, and an optical power sensing circuit. The directional coupler may be configured to receive an optical signal and split the optical signal into a first signal including a first portion of the optical signal and a second signal including a second portion of the optical signal. The first signal path may be configured to receive the first signal and may include a first photodetector, a first transimpedance amplifier (TIA), and an interpolator. The first TIA may be coupled to the first photodetector. The interpolator may be coupled to the first TIA. The second signal path may be configured to receive the second signal and may include a second photodetector, a second TIA, and the interpolator. The second TIA may be coupled to the second photodetector. The interpolator may be coupled to the second TIA. The interpolator may be configured to generate an output signal based on at least one of an output of the first TIA and an output of the second TIA. The optical power sensing circuit may be configured to detect a power level of at least one of a signal within the first signal path, a signal within the second signal path, or the output signal from the interpolator. The optical receiver may be configured to select at least one of the first signal path or the second signal path to generate the output signal based on the detected power level.

In another example embodiment, an optical receiver includes at least one directional coupler, a first signal path, a second signal path, and an optical power sensing circuit. At least one input of the directional coupler may be configured to couple to an optical fiber. The first signal path may include a first photodetector coupled to an output of the at least one directional coupler, a first TIA including an input coupled to the first photodetector, and an adder coupled to an output of the first TIA. The second signal path may include a second photodetector coupled to an output of the at least one directional coupler, a second TIA including an input coupled to the second photodetector, and the adder coupled to an output of the second TIA. The optical power sensing circuit may be coupled to at least one of the first TIA, the second TIA, the adder, and an output of the optical receiver.

In another example embodiment, a method may include splitting an optical signal into a first optical signal and a second optical signal via a directional coupler, the first optical signal including a first portion of the optical signal and the second optical signal including a second, lesser portion of the optical signal. The method may also include converting the first optical signal into a first current signal in a first signal path. The method may also include converting the second optical signal into a second current signal in a second signal path. The method may also include amplifying the first current signal to generate a first amplified signal in the first signal path. The method may also include directly or indirectly detecting a power level of the optical signal. The method may also include disabling the first signal path and enabling the second signal path in response to the power level of the optical signal increasing above a threshold value.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Various embodiments disclosed herein relate to optical receivers. More specifically, some embodiments relate to optical receivers including a plurality of signal paths, which may be selectable based on a detected output power level of at least one of the signal paths.

Optical transceivers may include a receiver optical subassembly ("ROSA") and a transmitter optical subassembly ("TOSA"). The ROSA may include a photodiode or other optical detector for detecting optical signals and sensing circuitry for converting the optical signals to electrical signals compatible with other network components. The TOSA may include a laser or other suitable light source for transmitting optical signals and may further include control circuitry for modulating the laser according to an input digital data signal and a photodetector to monitor laser power.

Conventional optical receivers that use vertically illuminated photodetectors and published silicon photonics receivers that use waveguide photodetectors may use one photodetector/transimpedance amplifier (TIA) combination to cover a relatively large input optical power dynamic range. To prevent receiver overload at high optical power, a transimpedance circuit may include shunt elements at an input of the TIA, a reduced input stage gain, and/or signal clamping circuits that may complicate the design and compromise the sensitivity and linearity of a TIA input stage.

Silicon photonics or other integrated photonic technologies may enable use of multiple integrated photodetectors and the ability to split an incoming signal into multiple signal paths. Directional couplers may offer extremely low optical insertion loss and controlled splitting ratios, which, when combined with the integrated photodetectors, enable new circuit topologies that may circumvent the limitations found in conventional optical receivers.

Embodiments of the present disclosure will be explained with reference to the accompanying drawings.

Figure 1:
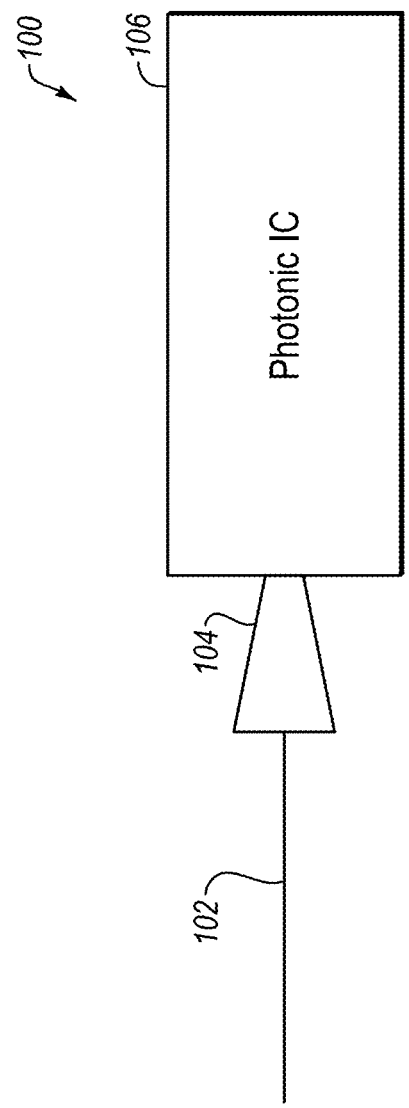
FIG. 1 illustrates an example optical receiver system including a photonic integrated circuit.

FIG. 1 illustrates an example optical receiver system 100 (hereinafter "system 100"), arranged in accordance with at least one embodiment described. The system 100, which may include, for example, an optical receiver, includes an optical fiber 102, a spot size converter 104, and a photonic integrated circuit (PIC) 106. The optical fiber 102 may include any type of optical fiber, such as a multi-mode fiber or single-mode fiber, configured to transmit an optical signal. During a contemplated operation of the system 100, an optical signal may be transmitted to the photonic IC 106 via the optical fiber 102.

Figure 2A:
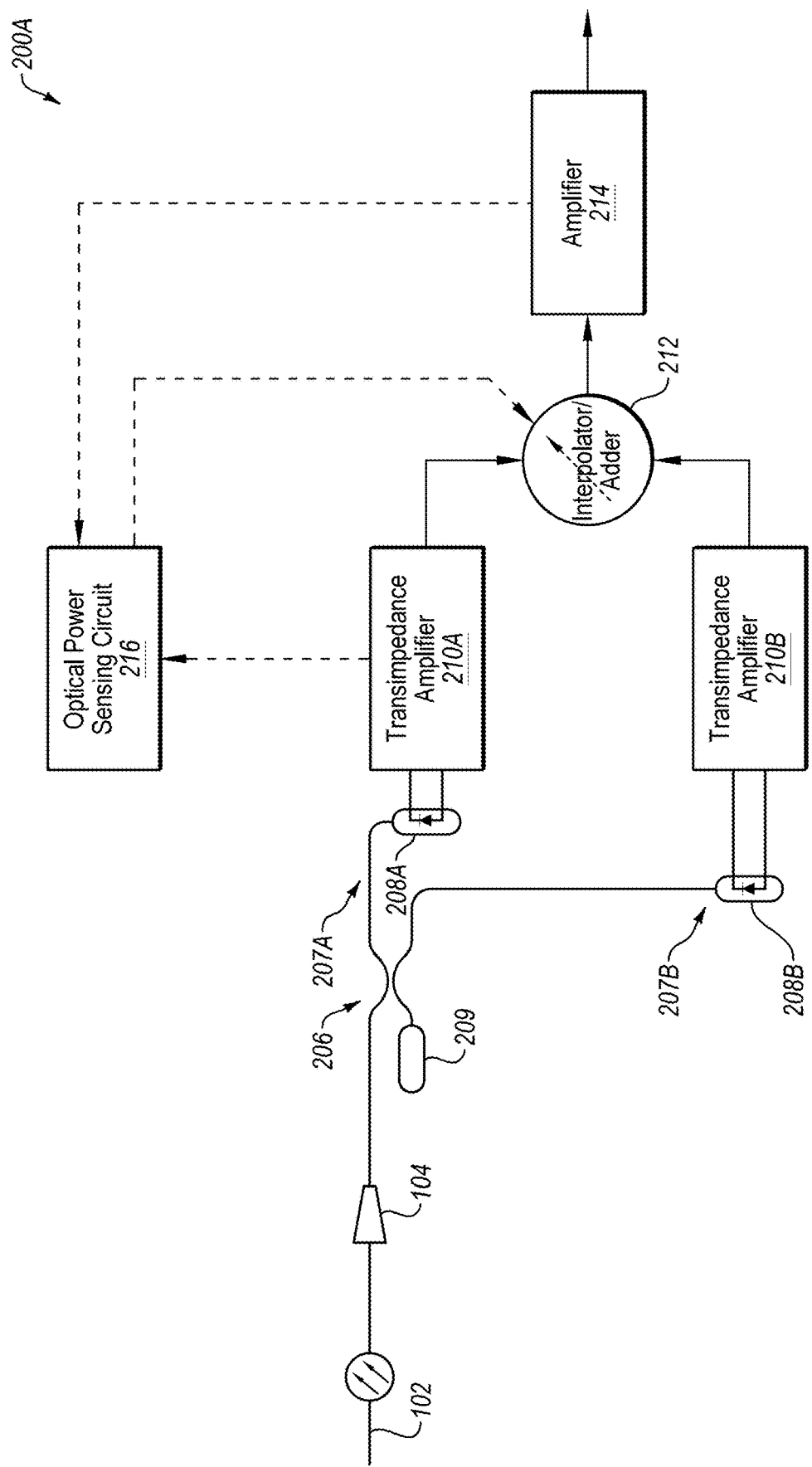
FIG. 2A depicts an example optical receiver system.

FIG. 2A depicts an example optical receiver system 200A (hereinafter system 200A), arranged in accordance with at least one embodiment described herein. The system 200A may include, correspond to, or be included in the system 100 of FIG. 1. The system 200A, which includes an optical receiver, includes the optical fiber 102 and the spot size converter 104 of FIG. 1. The system 200A further includes a directional coupler 206 and multiple signal paths. For example, in this example, the system 200A includes signal paths 207A and 207B, collectively hereinafter "signal paths 207". The signal path 207A includes a photodetector 208A, a TIA 210A, and an interpolator 212. The signal path 207B includes a photodetector 208B, a TIA 210B, and an interpolator 212. The TIAs 210A, 210B may be collectively referred to hereinafter as "TIAs 210". The path 207B further includes a waveguide terminator 209.

Each of photodetectors 208A and 208B (collectively "photodetectors 208") may be configured to generate a current in response to an incident optical signal. The optical power of the incident optical signal may determine the current that flows in the corresponding one of the photodetectors 208. In effect, the optical signal may generate a current in the photodetectors 208 that corresponds to a digital data carried via the optical fiber 102. According to some embodiments, the TIA 210A and TIA 210B may be similar, or identical, circuits, and may be configured for optimal input referred noise performance.

As described more fully below, the system 200A may be configured to enable one signal path (e.g., either the signal path 207A or 207B) and to disable the other signal path based on an output power level within the system 200A (e.g., within one of the signal paths 207).

As depicted, the interpolator (also referred to herein as "adder") 212 is coupled to an output of each of the TIA 210A and the TIA 210B. Further, the system 200A includes an amplifier 214 coupled to an output of the interpolator 212, and an optical power sensing circuit 216, which may be coupled to the TIA 210A, the TIA 210B, the interpolator 212, and/or the amplifier 214. The optical power sensing circuit 216 may be configured to detect an optical power level within the system 200A. More specifically, the optical power sensing circuit 216 may detect the optical power level within, for example, the TIA 210A, the TIA 210B, at an output of the interpolator 212, and/or at an output of the amplifier 214. Further, as described more fully below, based on the detected optical power level, the system 200A may transition between the signal paths 207 (e.g., from the signal path 207A to the signal path 207B, or vice versa). The optical power sensing circuit 216 may also be referred to as and/or may include an optical power sensor.

In some embodiments, the photonic IC 106 (see FIG. 1) may include and/or may have coupled thereto the directional coupler 206, the photodetectors 208, the TIA 210A, the TIA 210B, the interpolator 212, the amplifier 214, and/or the optical power sensing circuit 216 of FIG. 2A.

During a contemplated operation of the system 200A, an optical signal may be received at the directional coupler 206, and the directional coupler 206 may split the received optical signal into two portions, each directed to a different one of the signals paths 207. In some embodiments, one signal path, such as the signal path 207A, may be configured to convey a certain portion (e.g., a percentage) of the optical signal and another signal path, such as the signal path 207B, may be configured to convey another portion (e.g., another percentage, such as a lesser percentage) of the optical signal. More specifically, for example, the signal path 207A may be configured to convey X % of the optical signal while the signal path 207B may be configured to convey 100–X % of the signal. For example, X may be a value between substantially 75 and substantially 100. Thus, as one example, the signal path 207A may convey 75% of the optical signal and the signal path 207B may convey 25% of the optical signal. In another example, the signal path 207A may convey 80% of the optical signal and the signal path 207B may convey 20% of the optical signal. In yet another example, the signal path 207A may convey 90% of the optical signal and the signal path 207B may convey 10% of the optical signal.

Although the system 200A is illustrated in FIG. 2A as including two signal paths 207, the present disclosure is not so limited. More generally, the system 200A may include multiple signal paths (e.g., two signal paths, three signal paths, four signal paths, five signal paths, etc.)

Moreover, in response to an incident optical signal thereon, each of the photodetectors 208 may generate an associated electrical signal, such as a current signal, which may be conveyed to an associated one of the TIAs 210. More specifically, the photodetector 208A may convey a current signal to the TIA 210A and the photodetector 208B may convey a current signal to the TIA 210B.

Further, in some embodiments, one of the TIA 210A and the TIA 210B may be enabled and the other of the TIA 210A and the TIA 210 may be disabled. More specifically, in some embodiments, the signal path 207A, and more specifically the TIA 210A, may be configured to be enabled (e.g., in an active mode) at low optical power, and the signal path 207B, and more specifically the TIA 210B, may be configured to be disabled (e.g., in a non-active mode) (e.g., at the same low optical power). At an increased or high optical power in the system 200A, an output signal out of the TIA 210A may be distorted while an output signal out of the TIA 210B, which may be a fraction of the output signal of the TIA 210A (e.g., ((100−X)/X)), may be linear. Accordingly, in some embodiments, the signal path 207A, and more specifically the TIA 210A, may be configured to be disabled (e.g., non-active) at high optical power, and the TIA 210B may be configured to be enabled (e.g., active) at high optical power since the TIA 210B receives only a fraction of the optical power and thus generates a non-distorted signal at its output even when the optical power of the optical signal received by the system 200A is a high optical power.

The optical power sensing circuit 216 may be configured to detect the optical power level in the system 200A based on, e.g., the output of the TIA 210A, the output of the TIA 210B, the output of the interpolator/adder 212, and/or the output of the amplifier 214. Alternatively or additionally, the optical power sensing circuit 216 may control switchovers between the TIA 210A and the TIA 210B depending on the detected optical power. For example, if the detected optical power increases from low optical power to high optical power, e.g., if the detected optical power increases above a threshold optical power, the optical power sensing circuit 216 may disable the TIA 210A and enable the TIA 210B. Alternatively or additionally, if the detected optical power decreases from high optical power to low optical power, e.g., if the detected optical power decreases below the threshold optical power, the optical power sensing circuit 216 may enable the TIA 210A and disable the TIA 210B. Alternatively or additionally, there may be a transitional input optical power range (described below) defined between a first threshold optical power and a second threshold optical power; if the detected optical power increases from below or above the transitional input optical power range into the transitional input optical power range, the optical power sensing circuit 216 may enable both of the TIAs 210 until the detected optical power is outside the transitional input optical power range.

In some embodiments, transitioning from one signal path to another signal path may be substantially instantaneous (e.g., only one TIA conveying a signal at any one time). In other embodiments, a transition period may exist wherein more than one path may be active, and one path may ramp-up and another path may ramp-down during the transition period (e.g., a time period). Stated another way, a transitional input optical power range to activate one signal and deactivate another signal path may exist.

The interpolator 212 may select the output of one or both of the TIAs 210 to output to the amplifier 214, e.g., based on a control signal from the optical power sensing circuit. Alternatively or additionally, the interpolator 212 may combine, e.g., add, the output of the TIA 210A and the output of the TIA 210B to output to the amplifier 214. For example, if both TIAs 210 are enabled, e.g., during a transition period where the detected optical power is in the transitional input optical power range, a control signal from the optical power sensing circuit 216 may cause the interpolator 212 to add the outputs of the TIAs 210 to output the combined output to the amplifier 214.

The amplifier 214 may be configured to amplify the output of the interpolator 212 to be at or near a target output level and/or within a target output level range of the system 200A. The amplifier 214 may include an amplifier or an attenuator with a fixed or variable gain, such as a variable gain amplifier (VGA), with or without automatic gain control. In these and other embodiments, the output of the interpolator 212 may have a signal amplitude proportional to the signal at the output of the TIA 210A until it reaches a crossover region (or transitional input optical power range of the system 200A), at which point the amplitude at the output of the interpolator 212 may remain constant until the first signal path 207A is no longer active. Then, the output of the interpolator 212 may have a signal amplitude proportional to the signal at the output of the second TIA 210B. Thus, the foregoing arrangement may increase dynamic range without necessarily ensuring linearity at the output of the interpolator 212. The amplifier 214 may include internal automatic gain control (see, e.g., FIG. 4) to provide linearity.

By transitioning from one signal path to another signal path, the dynamic range of system 200A may be improved (e.g., by X/(100−X)). For example, if X=80%, the optical dynamic range may be increased by 80/20=4=6 dB. In this example, the sensitivity of the system 200A may be degraded by, for example, 10.LOG 10 (0.8)=1 dB. Therefore, the dynamic range of the system 200A may improve by, for example, 5 dB (e.g., 6−1=5), when compared to only a single path (e.g., the signal path 210A) with X=100%.

In some embodiments, the directional coupler 206 may include a polarization dependent directional coupler 206. In other embodiments, the directional coupler 206 may include a polarization independent directional coupler 206. An example polarization independent directional coupler is described in more detail elsewhere herein.

Figure 2B:
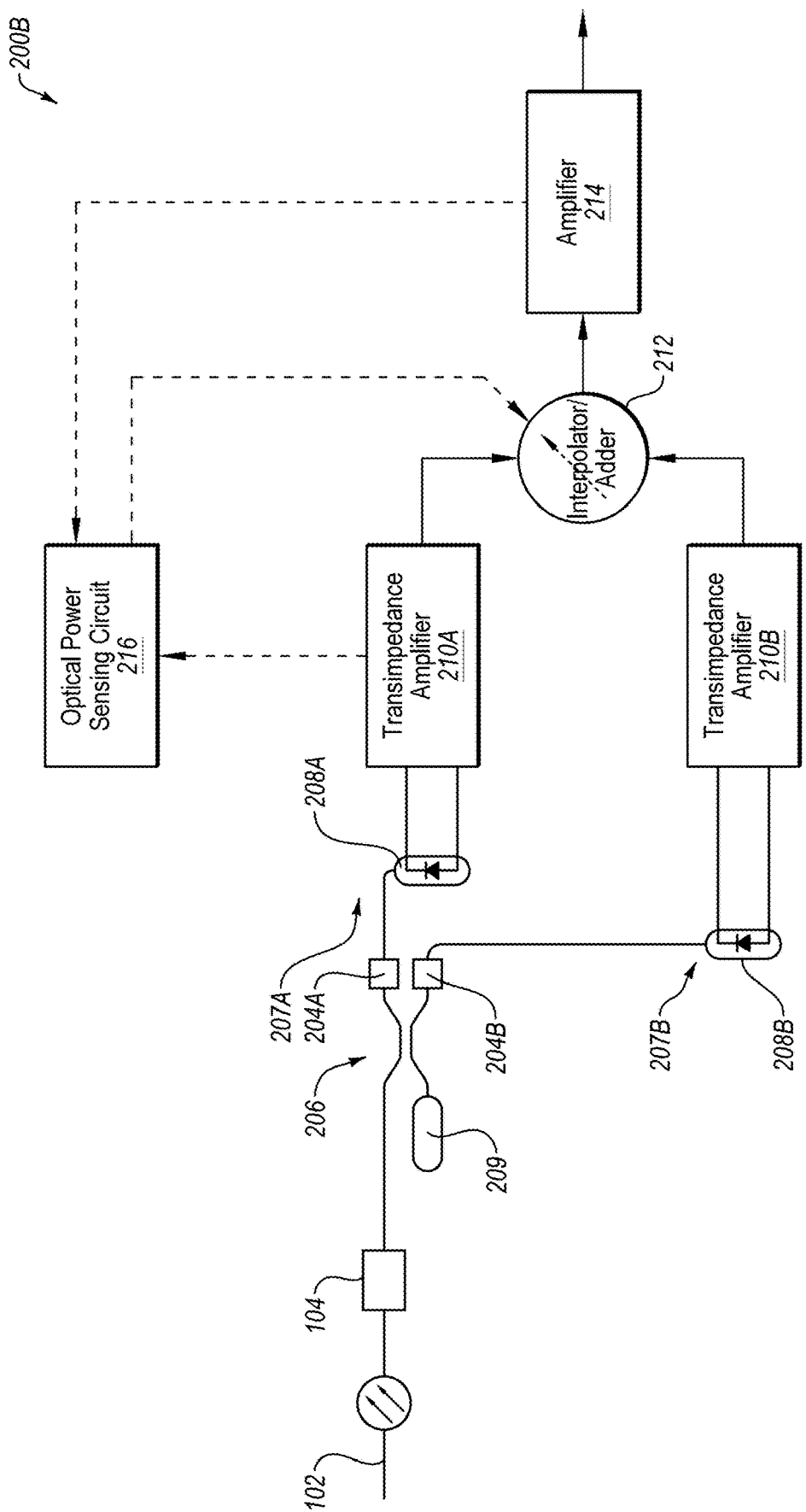
FIG. 2B depicts another example optical receiver system.

FIG. 2B depicts another example optical receiver system 200B (hereinafter "system 200B"), arranged in accordance with at least one embodiment described herein. The system 200B may include, correspond to, or be included in the system 100 of FIG. 1. The system 200B of FIG. 2B may include the same or similar components as the system 200A of FIG. 2A, including the directional coupler 206, the signal paths 207, the photodetectors 208, the TIAs 210, the interpolator 212, the amplifier 214, and the optical power sensing circuit 216. Accordingly, the system 200B may generally function in the same or similar manner as the system 200A, and a description of the foregoing components and the operation of the system 200B will not be repeated.

In addition, the system 200B of FIG. 2B includes two silicon nitride (SiN)-silicon (Si) couplers 204A, 204B (collectively hereinafter "SiN—Si couplers 204"), including one in each of the signal paths 207. In particular, the SiN—Si coupler 204A may be included in the signal path 207A to couple one output of the directional coupler 206 to the photodetector 208A of the signal path 207A, while the SiN—Si coupler 204B may be included in the signal path 207B to couple another output of the directional coupler 206 to the photodetector 208B of the signal path 207B. An example implementation of the SiN—Si couplers 204 is described elsewhere.

Figure 3:
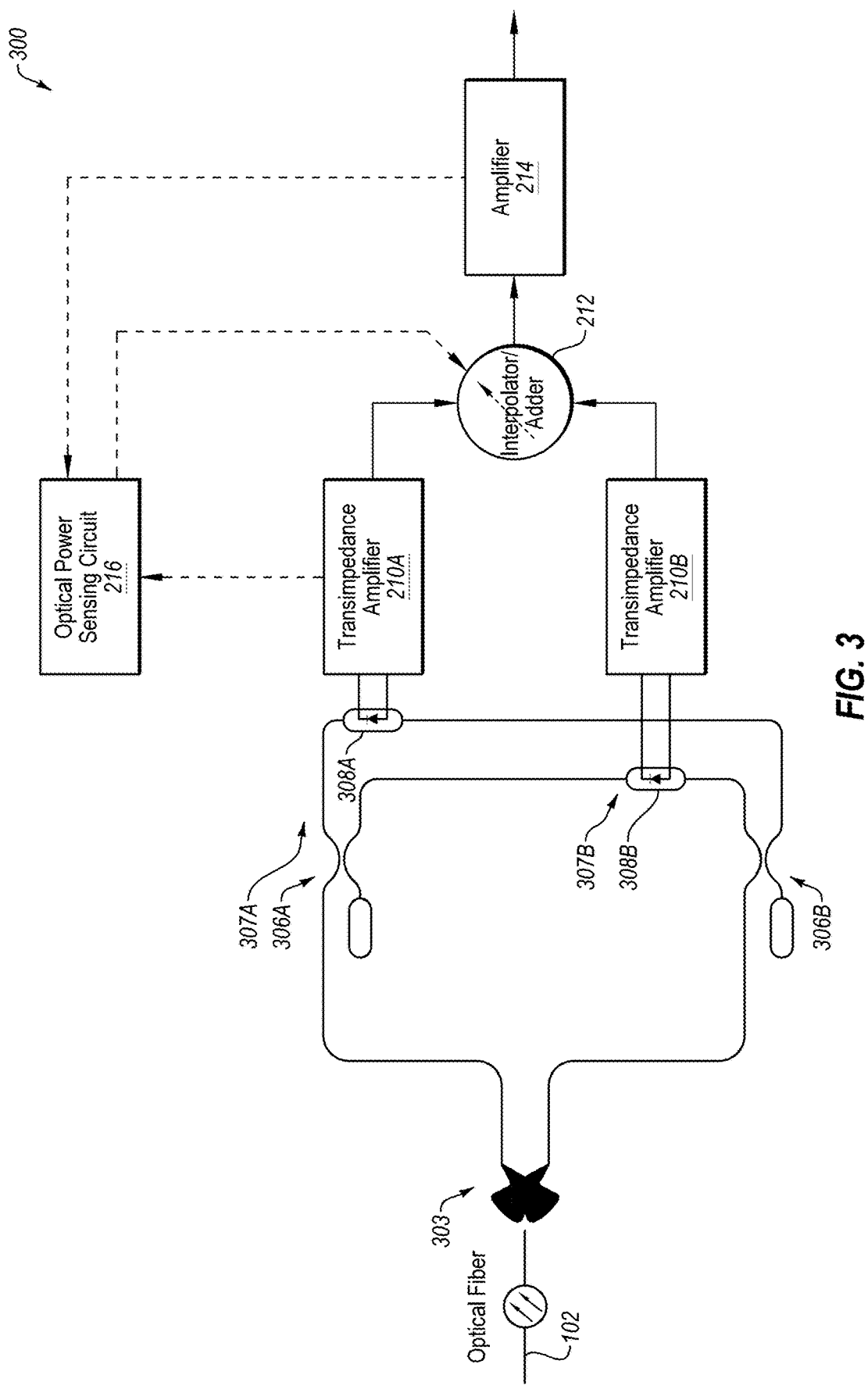
FIG. 3 illustrates another example optical receiver system.

FIG. 3 depicts another example optical receiver system 300 (hereinafter "system 300"), arranged in accordance with at least one embodiment described herein. The system 300 may include, correspond to, or be included in the system 100 of FIG. 1. In some embodiments, the system 300 may be implemented with silicon photonics technology devices. The system 300, which may include an optical receiver, includes the optical fiber 102 and an interface 303, which may include, for example, a grating coupler, a spot size coupler, and/or a polarization splitter. The system 300 further includes directional couplers 306A and 306B (collectively "directional couplers 306"). Further, in this embodiment, the system 300 includes multiple signal paths 307A and 307B (collectively "signal paths 307"). The signal path 307A includes a photodetector 308A, the TIA 210A and the interpolator 212. The signal path 307B includes a photodetector 308B, the TIA 210B, and the interpolator 212. The photodetectors 308A, 308B may be collectively referred to as "photodetectors 308") In some embodiments in which the interface 303 includes a polarization splitter, transverse electric (TE) waves of the received optical signal may be transmitted to one of the directional couplers 306 and transverse magnetic (TM) waves of the received optical signal may be transmitted to the other one of the directional couplers 306.

The interpolator 212, the amplifier 214, and/or the optical power sensing circuit 216 may operate within the system 300 in a similar or identical manner as in the system 200A and as already described above.

Each of photodetectors 308 may be configured to generate a current in response to an incident optical signal. The optical power of the incident optical signal may determine the current that flows in each of the photodetectors 308. In effect, the optical signal may generate a current in the photodetectors 308 that corresponds to a digital data carried via the optical fiber 102.

The system 300 further includes the interpolator 212 coupled to an output of each of the TIA 210A and TIA 210B, the amplifier 214 coupled to an output of the interpolator 212, and the optical power sensing circuit 216, which may be coupled to the TIAs 210, the interpolator 212, and/or the amplifier 214.

In some embodiments, the photonic IC 106 (see FIG. 1) may include and/or may have coupled thereto the directional couplers 306, the photodetectors 308, the TIAs 210, the interpolator 212, the amplifier 214, and/or the optical power sensing circuit 216 of FIG. 3.

Similar to the system 200A of FIG. 2A, during a contemplated operation of the system 300, an optical signal propagating on the optical fiber 102 is received at the interface 303 and may be divided into a first component with a first polarization (e.g., TE polarization) and a second component with a second polarization (e.g., TM polarization). One of the polarization c, components may be directed to the directional coupler 306A and the other of the polarization components may be directed to the other directional coupler 306B.

The directional coupler 306A may split a received optical signal, such as one of the polarization components received from the interface 303, into two portions, each directed to a different one of the signal paths 307. Similarly, the directional coupler 306B may split a received optical signal, such as the other one of the polarization components received from the interface 303, into two portions, each directed to a different one of the signal paths 307. In some embodiments, one path, such as path 307A, may be configured to convey a certain portion (e.g., a percentage) of a received optical signal and another signal path, such as the signal path 307B, may be configured to convey another portion (e.g., another percentage, such as a lesser percentage) of the received optical signal. More specifically, for example, the signal path 307A may be configured to convey X % of the received optical signal (whether from either or both of the directional couplers 306) while the signal path 307B may be configured to convey 100-X % of the received optical signal (whether from either or both of the directional couplers 306). For example, X may be a value between substantially 75 and substantially 100. Thus, as one example, the signal path 307A may convey 75% of the received optical signal and the signal path 307B may convey 25% of the signal. In another example, the signal path 307A may convey 80% of the received optical signal and the signal path 307B may convey 20% of the received optical signal. In yet another example, the signal path 307A may convey 90% of the received optical signal and the signal path 307B may convey 10% of the received optical signal.

Although the system 300 is illustrated in FIG. 3 as including two signal paths 307, the present disclosure is not so limited. More generally, the system 300 may include multiple signal paths (e.g., two signal paths, three signal paths, four signal paths, five signal paths, etc.)

Moreover, in response to an incident optical signal thereon, each of photodetectors 308 may generate an associated electrical signal, such as current signal, which may be conveyed to an associated one of the TIAs 210. More specifically, the photodetector 308A may convey a current signal to the TIA 210A and the photodetector 308B may convey a current signal to the TIA 210B.

Further, in some embodiments, one of the TIA 210A and the 210B may be enabled and the other of the TIA 210A and the TIA 210 may be disabled in the system 300. More specifically, in some embodiments, the signal path 307A, and more specifically the TIA 210A, may be configured to be in an active mode at low optical power, and the signal path 307B, and more specifically the TIA 210B, may be configured to be disabled at low optical power. Alternatively or additionally, both of the TIAs 210 may be enabled during a transition period in which the detected optical power is within a transitional input optical power range.

At an increased or high optical power in the system 300, an output signal out of the TIA 210A may be distorted while an output signal out of the TIA 210B, which may be a fraction of the output signal of the TIA 210A, may be linear. Accordingly, in some embodiments, the signal path 307A, and more specifically the TIA 210A, may be configured to be disabled at high optical power, and the TIA 210B may be configured to be active at high optical power. Accordingly, the dynamic range of the system 300 may be improved.

As noted above, in some embodiments, transitioning from one signal path to another signal path may be substantially instantaneous (e.g., only one TIA conveying a signal at any one time). In other embodiments, during a transitional input optical power range, more than one signal path may be active for a transition period, e.g., one signal path may ramp-up and the other signal path may ramp-down during the transition period (e.g., a time period).

Figure 4:
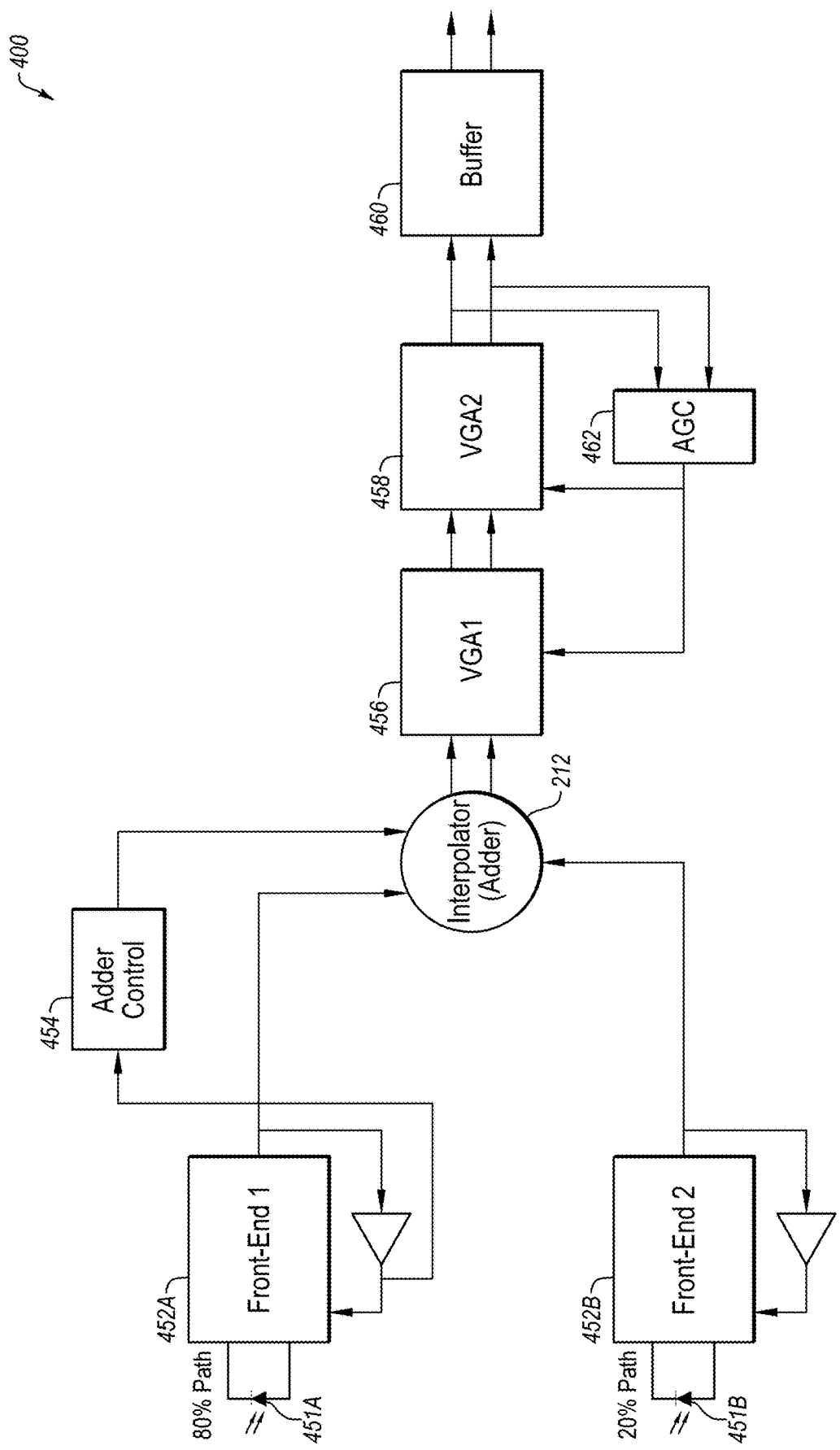
FIG. 4 depicts an example system including a plurality of optical front-ends.

FIG. 4 is a block diagram depicting an example system 400, arranged in accordance with at least one embodiment described herein. The system 400 includes photodetectors 451A, 451B (collectively "photodetectors 451"), receiver front-ends 452A, 452B (collectively "receiver front-ends 452"), the interpolator 212, a control 454, a first VGA 456, a second VGA 458, a buffer 460, and an automatic gain control (AGC) 462. Each of the receiver front-ends 452 may include at least a portion of the system 200A (see FIG. 2A) or at least a portion of the system 300 (see FIG. 3). More specifically, the receiver front-end 452A and/or the receiver front-end 452B may include the TIA 210A and/or the TIA 210B (see FIGS. 2A-3). Alternatively or additionally, the photodetectors 451 may include or correspond to the photodetectors 208, 308 (see FIGS. 2A-3), while the control 454 may include, may be included in, and/or may correspond to the optical power sensing circuit 216 of FIGS. 2A-3.

In a contemplated operation, the system 400 may be operated in the same or a similar manner to one or more of the systems 200A, 200B, 300. For example, the control 454 may sense average optical power, e.g., at one or both of the photodetector 451, and may activate one or both of the receiver front ends 452 and/or may deactivate one of the receiver front ends 452 depending on the detected optical power. The interpolator 212 interpolates output(s) of the receiver front end(s) 452. The output of the interpolator 212 may need to be further amplified or attenuated to reach a target output level. The amplification or attenuation may be provided by one or both VGAs 456, 458, and the amount of amplification or attenuation may be controlled through an AGC loop that includes the AGC 462. The buffer 460 may provide a drive capability to deliver a final output of the system 400.

Figure 5:
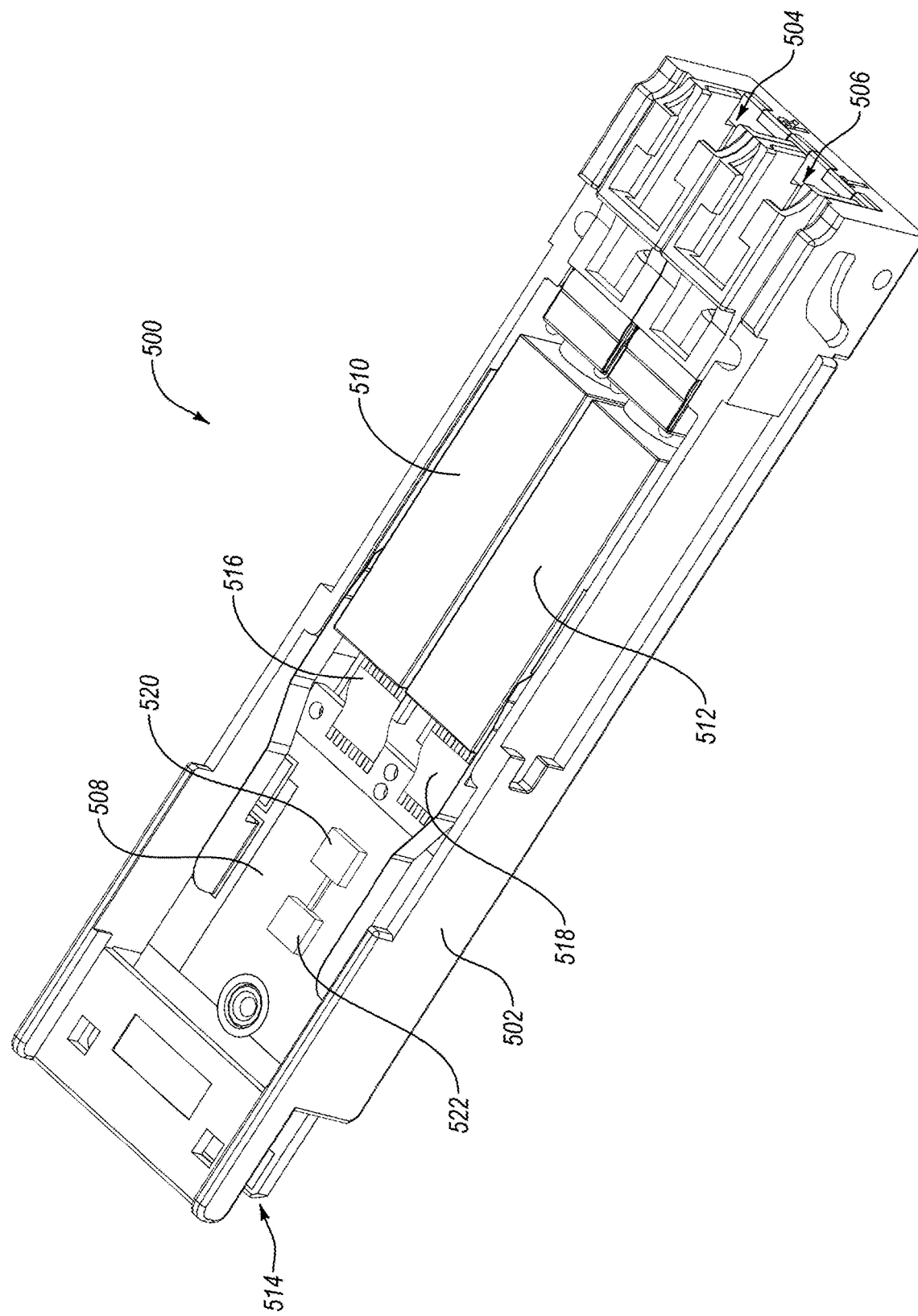
FIG. 5 illustrates an example optoelectronic module including at least one optical receiver.

FIG. 5 illustrates an example optoelectronic module 500 (hereinafter "module 500"), arranged in accordance with at least one embodiment described herein. The module 500 may be configured for use in transmitting and receiving optical signals in connection with a host device (not shown). Alternatively or additionally, the module 500 may include a portion or all of one or more of the systems 100, 200A, 300, 400 described herein.

As illustrated, the module 500 may include a bottom housing 502, a receive port 504, and a transmit port 506. The module 500 further includes a PCB 508 positioned within the bottom housing 502. The PCB 508 may include one or more integrated circuits (e.g., a first integrated circuit 520 and a second integrated circuit 522) positioned thereon. In addition, the module 500 includes a ROSA 510 and a TOSA 512 also positioned within bottom housing 502. An edge connector 514 may be located on an end of the PCB 508 to enable the module 500 to electrically interface with a host device. As such, the PCB 508 may facilitate electrical communication between the host device and the ROSA 510 and between the host device and the TOSA 512. Although not illustrated in FIG. 5, the module 500 may additionally include a top housing that cooperates with the bottom housing 502 to at least partially enclose one or more of the other components of the module 500.

The module 500 may be configured for optical signal transmission and reception at a variety of data rates, such as 1 Gb/s, 10 Gb/s, 20 Gb/s, 40 Gb/s, 100 Gb/s, or higher, or other data rates. Furthermore, the module 500 may be configured for optical signal transmission and reception at various distinct wavelengths using wavelength division multiplexing (WDM) using one of various WDM schemes, such as Coarse WDM, Dense WDM, or Light WDM. Furthermore, the module 500 may be configured to support various communication protocols, such as Fibre Channel and High Speed Ethernet. In addition, although illustrated in a particular form factor in FIG. 5, more generally, the module 500 may be configured in any of a variety of different form factors, such the Small Form-factor Pluggable (SFP), the enhanced Small Form-factor Pluggable (SFP+), the 10 Gigabit Small Form Factor Pluggable (XFP), the C Form-factor Pluggable (CFP) and the Quad Small Form-factor Pluggable (QSFP) multi-source agreements (MSAs).

The ROSA 510 may house one or more optical receivers (e.g., system 200A of FIG. 2A and/or system 300 of FIG. 3) that are electrically coupled to an electrical interface 516. The one or more optical receivers may be configured to convert optical signals received through the receive port 504 into corresponding current electrical signals that are relayed to an integrated circuit (e.g., within the ROSA 510) (not shown in FIG. 5; see e.g., integrated circuit 106 of FIG. 1) through an electrical interface 516 and the PCB 508. The TOSA 512 may house one or more optical transmitters, such as lasers, that are electrically coupled to another electrical interface 518. The one or more optical transmitters may be configured to convert electrical signals received from a host device by way of the PCB 508 and the electrical interface 518 into corresponding optical signals that are transmitted through the transmit port 506.

As noted above, an integrated circuit (not shown in FIG. 5), which may be similar to and/or correspond to the integrated circuit 106 of FIG. 1, may be integrated within the ROSA 510 and may be configured to convert the current electrical signals to voltage electrical signals and to equalize the voltage electrical signals. The integrated circuit may drive the equalized voltage electrical signals to a second integrated circuit (e.g., within the ROSA 510 and/or on the PCB 508), which, in some embodiments, may be a CDR circuit. Thus, in some embodiments, an integrated circuit, such as the integrated circuit 106 of FIG. 1, may be incorporated into the ROSA 510 and may be used to convert current electrical signals to equalized voltage electrical signals. Modifications, additions, or omissions may be made to the module 500 without departing from the scope of the present disclosure.

The module 500 illustrated in FIG. 5 is one architecture in which embodiments of the present disclosure may be employed. This specific architecture is only one of countless architectures in which embodiments may be employed. The scope of the present disclosure is not intended to be limited to any particular architecture or environment.

Figure 6:
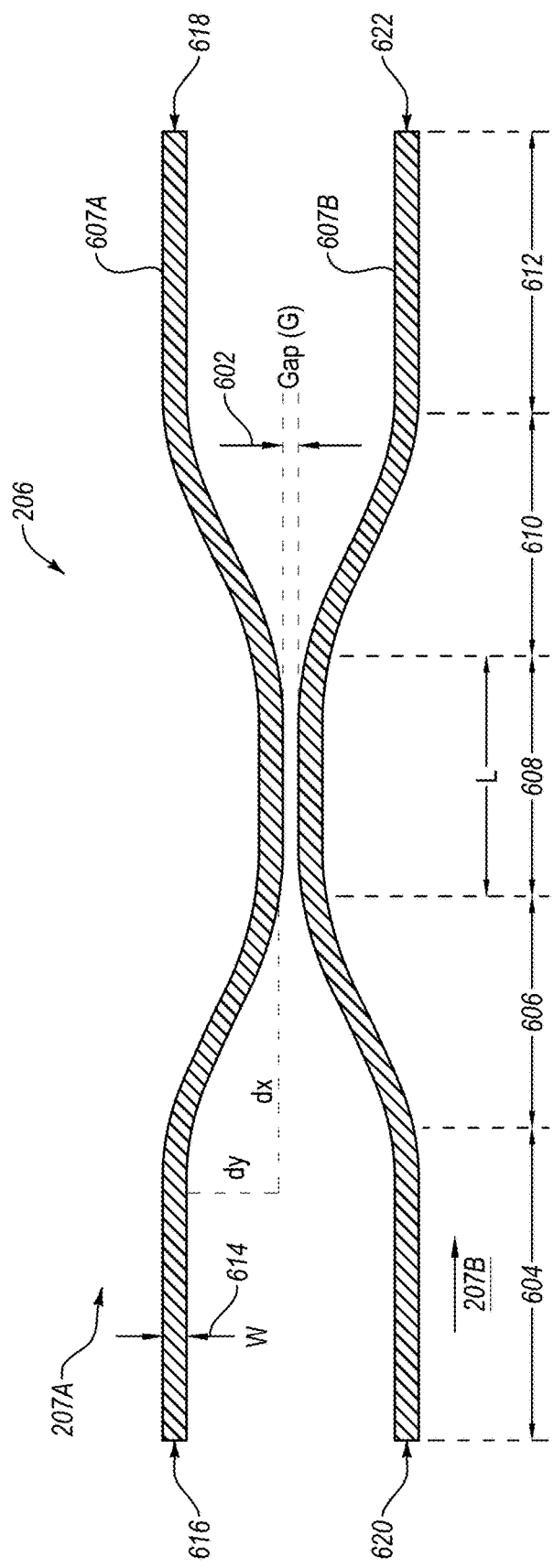
FIG. 6 illustrates an example implementation of a directional coupler of the optical receiver systems of FIGS. 2A-3.

FIG. 6 illustrates an example implementation of the directional coupler 206 of FIGS. 2A-3, arranged in accordance with at least one embodiment described herein. The directional coupler 206 of FIGS. 2A-3 may have different implementations than illustrated in FIG. 6, which is provided as one example implementation only.

The directional coupler 206 of FIG. 6 may be an 80/20 polarization independent directional coupler implemented in SiN in some embodiments. In more detail, the directional coupler 206 may be configured as paths or branches formed of SiN waveguides, e.g., SiN cores surrounded on one or more sides by a cladding. FIG. 6 illustrates the waveguide cores.

The directional coupler 206 may be formed with two SiN waveguides 607A and 607B (hereinafter collectively "waveguides 607", or individually "first waveguide 607A" and "second waveguide 607B") along or at least coupled to the signal paths 207A and 207B. The waveguides 607 are formed generally to run parallel with each other and then formed with a reduced separation distance of a gap G of at least a distance 602 to facilitate optical coupling of the optical signal. Each branch formed by the first waveguide 607A and the second waveguide 607B includes an enlarged gap input section 604, a decreasing gap input section 606 with a slope of approximately dy/dx, a minimum gap section 608 (also designated as having a length L where the gap G is at a minimum), an increasing gap section 610 with a slope of approximately dy/dx, and an enlarged gap output section 612.

Each of first and second waveguides 607A and 607B are formed to have a waveguide width W illustrated as width 614 and a waveguide thickness T (e.g., in and out of the page in FIG. 6). The width W, thickness T, and/or other dimensions and parameters may refer to dimensions and parameters of the cores of the waveguides 207 unless otherwise noted. For example, the width W 614 may refer to the width of the waveguide core of each of the waveguides 607. A similar convention may be followed throughout this document. The SiN material may be formed from a silicon nitride ($Si_3N_4$) material or other suitable material, e.g., with a high refractive index of about 1.9 used to determine a coupling length for the TE and TM polarization modes.

The first waveguide 607A may include an input port 616 and a first output port 618 with the first waveguide 607A being configured with a consistent width W and thickness T. The second waveguide 607B may include a coupled port 620 and a second output port 622 with the second waveguide 607B also being configured with a consistent width W and thickness T. The input port 616 of the first waveguide 607A may be optically coupled to, e.g., the optical fiber 102 of FIG. 2B through the spot size converter 104. The first output port 618 of the first waveguide 607A may be optically coupled to, e.g., the first photodetector 208A of FIG. 2B, either directly or through the SiN—Si coupler 204A of FIG. 2B. The coupled port 620 of the second waveguide 607B may be optically coupled to, e.g., the waveguide terminator 209 of FIG. 2B. The second output port 622 of the second waveguide 607B may be optically coupled to, e.g., the second photodetector 208B of FIG. 2B, either directly or through the SiN—Si coupler 204B of FIG. 2B.

FIG. 6 further illustrates a table identifying example values for variously dimensions of the directional coupler 206. Specifically, the identified dimensions are merely illustrative for an example manufacturing process and are not to be considered as limiting. The example dimensions in the table for the directional coupler 206 may result in an approximately 80%-20% split of the input signal and may provide approximately equal distribution of the TE and TM polarization of the signals in each of the first and second waveguides 607A and 607B. Further, the directional coupler 206 may provide signals to a receiver that enables the receiver to be configured as a less sophisticated receiver (e.g., as discussed with respect to FIGS. 2A and 2B) and allows for higher dynamic range and a linear response. Yet further, the directional coupler 206 may be polarization independent with nominal insertion loss with a split ratio tolerance of about 80%+/−5% and 20%+1-5% operating at a frequency with a wavelength, for example, of about 1310 nanometers (nm) with +1-6.5 nm. The directional coupler 206 may be formed using SiN waveguide cores with silicon dioxide ($SiO_2$) cladding on one or more sides of each of the SiN waveguide cores. The waveguide parameters may be as shown in the table of FIG. 6 resulting in a refractive index, for example, of approximately 1.9. Alternatively, the waveguide parameters in the table of FIG. 6 may be modified.

In operation, the input port 616 is configured to receive an optical signal including both TE and TM polarization over an operation band of frequencies having wavelengths between, for example, 1.3 μm and 1.32 μm. The optical signal then passes through the first waveguide 607A and cross-couples to the second waveguide 607B in the minimum gap section 608 (also designated as to have a length L). Because of the dimensions identified herein for the structures forming the directional coupler 206, the TE polarization mode and the TM polarization mode of the input optical signal are distributed substantially equally in both the first waveguide 607A and the second waveguide 607B.

Figure 7:
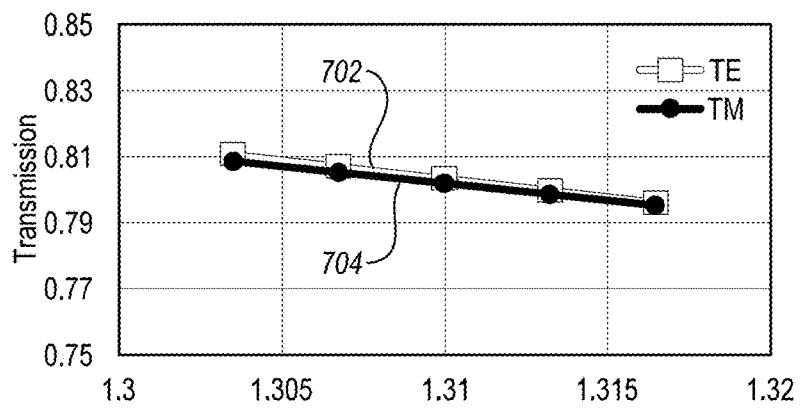
FIG. 7 depicts plots of simulated results of the directional coupler of FIG. 6.
Figure 7:
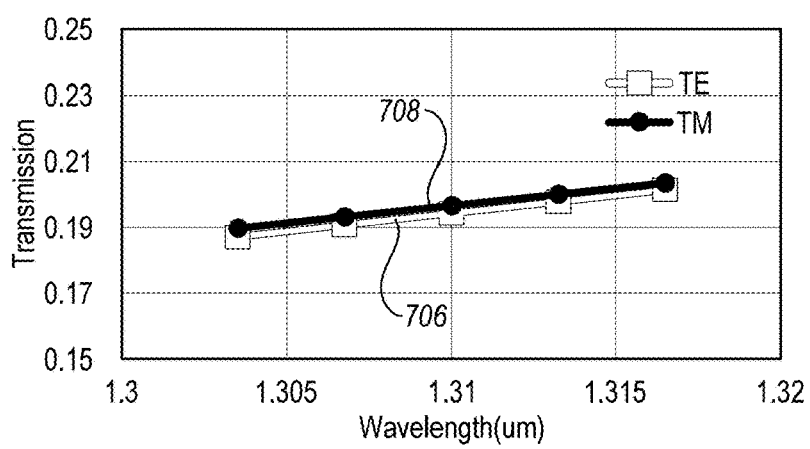
Figure 7:
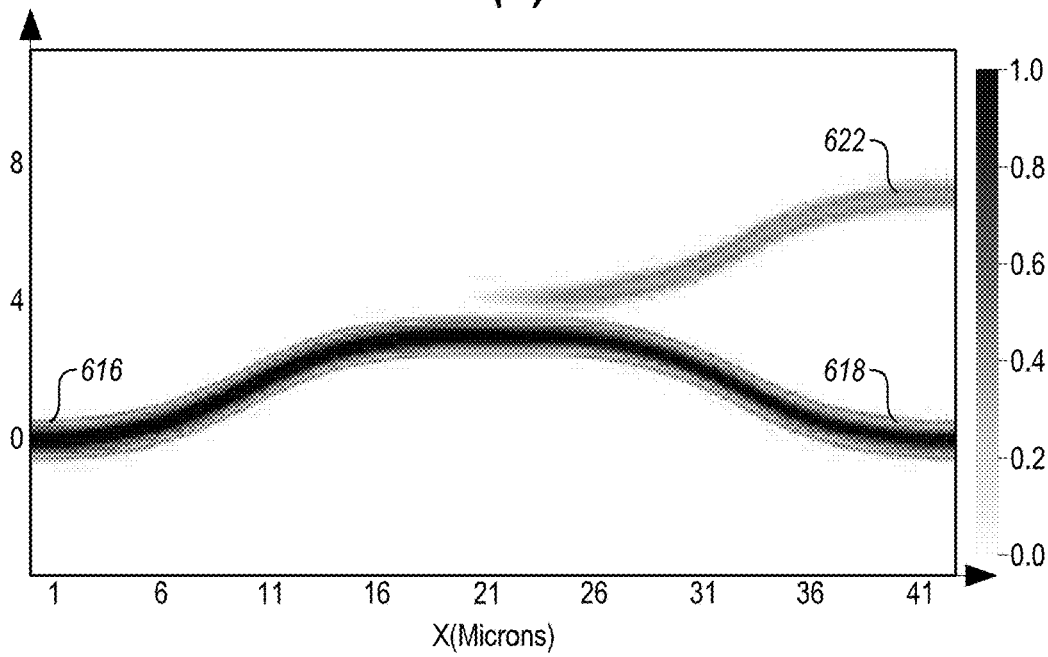

FIG. 7 illustrates simulation plots of results for the directional coupler 206 of FIG. 6, arranged in accordance with at least one embodiment described herein. In FIG. 7, a plot (A) simulates optical signal transmission from the first input port 616 to the first output port 618 (e.g., a ratio of an optical signal present at the first output port 618 with respect to the optical signal present at the first input port 616) as a function of optical signal wavelength over a frequency band having wavelengths between about 1.3 μm to about 1.32 μm. In FIG. 7, plot (B) simulates optical signal transmission from the first input port 616 to the second output port 622 (e.g., a ratio of the optical signal present at the second output port 622 with respect to the optical signal present at the first input port 616) as a function of optical signal wavelength over the frequency band having wavelengths between about 1.3 μm to about 1.32 μm.

In plot (A), the simulated optical signal transmission of the TE mode of the optical signal from the first input port 616 to the first output port 618 is plotted as curve 702 while the simulated optical signal transmission of the TM mode of the optical signal from the first input port 616 to the first output port 618 is plotted as curve 704. In plot (B), the simulated optical signal transmission of the TE mode of the optical signal from the first input port 616 to the second output port 622 is plotted as curve 706 while the simulated optical signal transmission of the TM mode of the optical signal from the first input port 616 to the second output port 622 is plotted as curve 708.

The curves 702 and 704 of the plot (A) combined with the curves 706 and 708 of the plot (B) illustrate a splitting of the input optical signal to about a constant transmission portion of about 0.80 (e.g., 80%) to the first output port 618 and about 0.20 (e.g., 20%) to the second output port 622 for the frequency band having wavelengths between about 1.3 μm to about 1.32 Further, curves 702, 704, 706, and 708 illustrate approximately equal (less than 0.2%) distributions of TE and TM modes across the band of interest.

In FIG. 7, a plot (C) illustrates a power plot of the directional coupler 206 of FIG. 6. The plot (C) includes a vertical axis on the left side corresponding to vertical spacing of the directional coupler 206, with the directional coupler 206 in FIG. 7 oriented upside down compared to the directional coupler 206 illustrated in FIG. 6. The horizontal axis illustrates distance from the first input port 616, corresponding to a distance of 0 microns, and the first and second output ports 618, 622, corresponding to a distance of 41 microns. A vertical legend of optical power intensity is also illustrated on the right side of the plot (C). As illustrated, the second output port 622 (illustrated as the upper right-hand branch) exhibits an optical power intensity of about 20% when compared to the optical power intensity legend, while the first output port 618 exhibits an optical power intensity of about 80% when compared to the optical power intensity legend.

Figure 8:
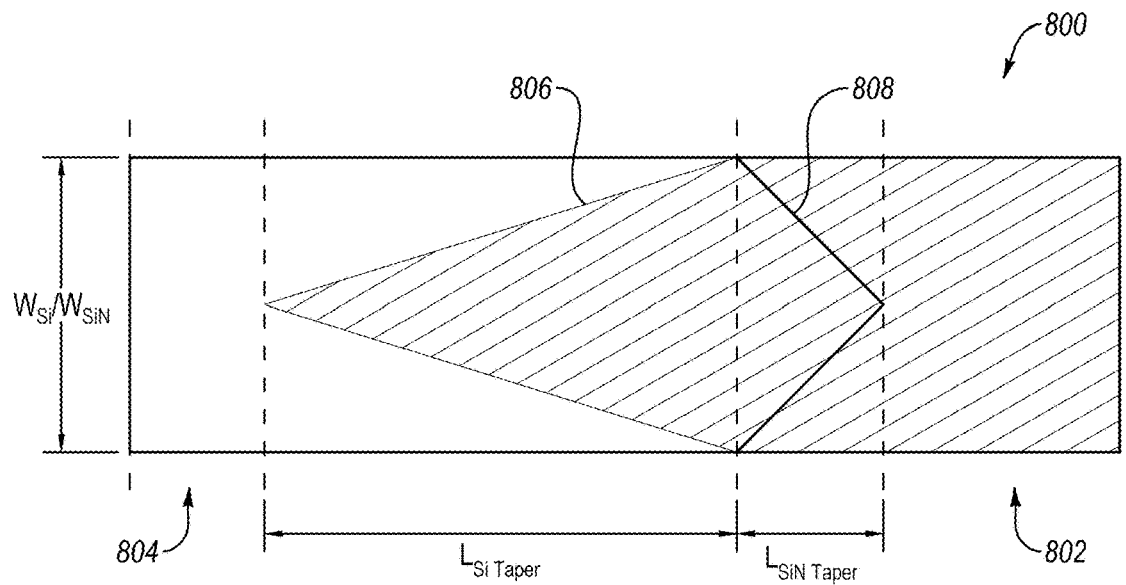
FIG. 8 is an overhead view of an example SiN—Si multimode adiabatic coupler.

Embodiments described herein may alternately or additionally include a SiN—Si multimode adiabatic coupler, which may relax Si tip width fabrication tolerance. FIG. 8 is an overhead view of an example SiN—Si multimode adiabatic coupler 800 (hereinafter "coupler 800"), arranged in accordance with at least one embodiment described herein. Either or both of the SiN—Si couplers 204 of FIG. 2B may be implemented similar or identical to the coupler 800 of FIG. 8.

Figure 9:
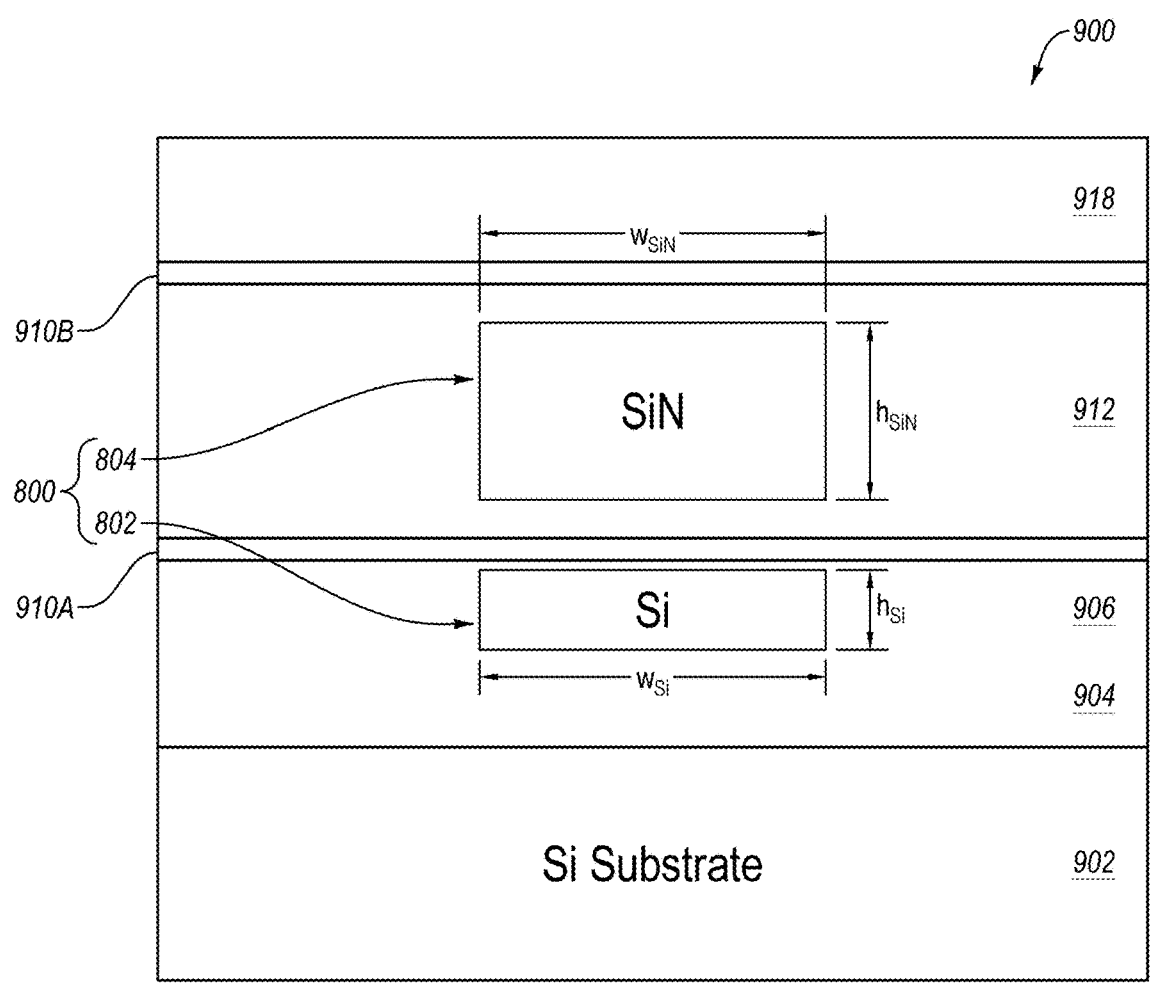
FIG. 9 illustrates an example optical system in which the SiN—Si multimode adiabatic coupler of FIG. 8 may be implemented, all arranged in accordance with at least one embodiment described herein.

The coupler 800 may be included in any of the systems described herein, such as in the systems 200A, 200B of FIGS. 2A, 2B as the SiN—Si coupler 204A and/or as the SiN—Si coupler 204B of FIG. 2B. The coupler 800 includes a Si waveguide 802 and a SiN waveguide 804. Each of the Si waveguide 802 and the SiN waveguide 804 includes a core, e.g., a core of Si for the Si waveguide 802 or a core of SiN for the SiN waveguide 804, and a cladding. FIG. 8 illustrates the cores of the Si and SiN waveguides 802, 804; the cores of the Si and SiN waveguides 802, 804 and the cladding are illustrated in FIG. 9 according to an example implementation. The cladding may include $SiO_2$ or other suitable cladding. In the example of FIG. 8, the SiN waveguide 804 is vertically displaced above the Si waveguide 802 and is illustrated as semi-transparent to show the Si waveguide 802 therebeneath. In other embodiments, the SiN waveguide 804 may be vertically displaced below the Si waveguide 802.

Each of the Si waveguide 802 and the SiN waveguide 804 includes a tapered section at an end thereof. In particular, the Si waveguide 802 includes a Si taper 806 and the SiN waveguide 804 includes a SiN taper 808. An end of the Si waveguide 802 opposite the Si taper 806 may be optically coupled to an optical receiver, such as a germanium (Ge) detector. For example, the photodetector 208A of FIG. 2B may include a Ge detector to which the end of the Si waveguide 802 opposite the Si taper 806 may be coupled.

The coupler 800 may be configured to adiabatically couple light from the SiN waveguide 804 through the SiN taper 808 and the Si taper 806 into the Si waveguide 802, which light may then be coupled out to the Ge detector or other optical receiver. Additional details regarding adiabatic coupling are disclosed in U.S. Pat. No. 9,405,066, issued on Aug. 2, 2016 (hereinafter the '066 patent) and U.S. application Ser. No. 15/596,958 (hereinafter the '958 application), filed May 16, 2017. The '066 patent and the '958 application are incorporated herein by reference in their entireties.

From left to right in FIG. 8, the Si taper 806 may gradually change from a relatively narrow tip to a multimodal waveguide with a width $w_{Si}$ suitable for multimode optical signals. In an example implementation, the width of the relatively narrow tip of the Si taper 806 may be in a range from 100-120 nm and the width $w_{Si}$ may be about 1 micrometer (μm). A length of the Si taper 806 is denoted in FIG. 8 as $L_{Si\ taper}$. Above the Si taper 806, the SiN waveguide 804 may have a constant width and/or height, e.g., the portion of the SiN waveguide 804 above the Si taper 806 does not taper.

Also from left to right in FIG. 8, the SiN taper 808 may taper down from a width $w_{SiN}$ suitable for multimode optical signals to a relatively narrow tip. In an example implementation, the width $w_{SiN}$ may be about 1 μm and the width of the relatively narrow tip of the SiN taper 808 may be around 250 nm. Although the widths $w_{Si}$ and $w_{SiN}$ are equivalent in this example, in other embodiments they may be different. A length of the SiN taper 808 is denoted in FIG. 8 as $L_{SiN\ taper}$ and may be about 0.01 mm in some embodiments. Below the SiN taper 808, the Si waveguide 802 may have a constant width and/or height, e.g., the portion of the Si waveguide 802 below the SiN taper 808 does not taper. An end of the SiN waveguide 804 opposite the SiN taper 808 may be coupled to, e.g., an output of the directional coupler 206 of FIG. 2B, such as the first output port 618 or the second output port 622 of the directional coupler 206 of FIG. 6.

FIG. 9 illustrates an example optical system 900 in which the coupler 800 of FIG. 8 may be implemented, arranged in accordance with at least one embodiment described herein. The optical system 900 may include a Si substrate 902, a buried oxide (BOX) layer 904 formed on the Si substrate 902, a Si waveguide layer 906 formed on the BOX layer 904 and that includes one or more Si waveguides such as the Si waveguide 802 of FIG. 8, a SiN slab 910A formed on the Si waveguide layer 906, a SiN waveguide layer 912 formed on the SiN slab 910A and that includes one or more SiN waveguides such as the SiN waveguide 804 of FIG. 8, and one or more dielectric layers 918 formed on the SiN waveguide layer 912. Optionally, a second SiN slab 910B may be formed between the SiN waveguide layer 912 and the dielectric layers 918. Each of the Si waveguide layer 906 and the SiN waveguide layer 912 may additionally include dielectric material, such as $SiO_2$ and/or other material(s) that serves as a cladding for the Si waveguide(s) and SiN waveguide(s) in each respective Si or SiN waveguide layer 906, 912.

The '066 patent and the '958 application disclose various example details of the elements included in the optical system 900 as well as various alternative arrangements (e.g., different order of layers) and/or other embodiments. The principles disclosed herein may be implemented in combination with none or one or more of the details, alternative arrangements, and/or other embodiments of the '066 patent and/or the '958 application.

As illustrated in FIG. 9, the Si waveguide 802 may include a height $h_{Si}$ and the width $w_{Si}$. The SiN waveguide 804 may include a height $h_{SiN}$ and the width $w_{SiN}$. FIG. 9 is a cross-sectional view of the optical system 900 taken at the location at which the width $w_{Si}$ of the Si waveguide 802 equals the width $w_{SiN}$ of the SiN waveguide 804. Stated another way, and with combined reference to FIGS. 8 and 9, the cross-sectional view of the optical system 900 may be taken at a location aligned to both the rightmost end in FIG. 8 of the Si taper 806 and to the leftmost end in FIG. 8 of the SiN taper 808.

The height $h_{Si}$ of the Si waveguide 802 may be about 300 nm or some other value in an example implementation. Alternatively or additionally, the width $w_{Si}$ of the Si waveguide 802 may be about 100 nm to 1,000 nm (or 0.1 μm to 1 μm) depending on which part of the Si waveguide 802 is being measured. For instance, the tip of the core of the Si waveguide 802 may be about 100 nm up to 120 nm which then tapers gradually up to 1 μm.

The height $h_{SiN}$ of the SiN waveguide 804 may be about 600 nm or some other value in an example implementation. Alternatively or additionally, the width $w_{SiN}$ of the SiN waveguide 804 may be about 250 nm to 1 μm depending on which part of the SiN waveguide 804 is being measured. For instance, the tip of the core of the SiN waveguide 804 may be about 250 nm which then tapers gradually up to 1 μm. In other embodiments, the width and/or height $w_{Si}$, $w_{SiN}$, and/or $h_{SiN}$ of the Si and SiN waveguides 802 and 804 may be different than the foregoing values.

Additional details regarding the coupler 800 and/or variations thereof are disclosed in the '958 application.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B c, together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   an optical receiver including:
      a directional coupler configured to receive an optical signal and split the optical signal into a first signal including a first portion of the optical signal and a second signal including a second portion of the optical signal;
      a first signal path configured to receive the first signal and including:
         a first photodetector;
         a first transimpedance amplifier (TIA) coupled to the first photodetector; and
         an interpolator coupled to the first TIA;
      a second signal path configured to receive the second signal and including:
         a second photodetector;
         a second TIA coupled to the second photodetector; and
         the interpolator coupled to the second TIA, the interpolator configured to generate an output signal based on at least one of an output of the first TIA or an output of the second TIA; and
      an optical power sensing circuit configured to detect a power level of at least one of a signal within the first signal path, a signal within the second signal path, or the output signal from the interpolator;
      wherein the optical receiver is configured to select at least one of the first signal path or the second signal path to generate the output signal based on the detected power level by:
         enabling the first TIA and disabling the second TIA when the signal power level is within a first range of signal power levels; and
         enabling the second TIA and disabling the first TIA when the signal power level is within a second range of signal power levels that does not overlap with the first range of signal power levels.

2. The system of claim 1, further comprising an amplifier coupled to an output of the interpolator and configured to generate an amplified output signal based on the output signal.

3. The system of claim 1, wherein the directional coupler comprises a silicon nitride (SiN) polarization independent directional coupler.

4. The system of claim 3, wherein the SiN polarization independent directional coupler comprises:
   a first SiN waveguide including an optical input port to receive the optical signal and a first output port optically coupled to the first photodetector in the first signal path; and
   a second SiN waveguide including a terminated port and a second output port optically coupled to the second photodetector in the second signal path, wherein:
      the first and second SiN waveguides are spaced apart to inhibit optical coupling in a first region;
      the first and second SiN waveguides are decreasingly spaced apart with respective slopes of the first and second SiN waveguides in a second region;
      the first and second SiN waveguides are substantially parallel for a distance L and spaced apart with an optical coupling gap G in a third region;
      the first and second SiN waveguides are increasingly spaced apart with respective slopes of the first and second SiN waveguides in a fourth region; and
      the first and second SiN waveguides are spaced apart to inhibit optical coupling in a fifth region.

5. The system of claim 1, wherein the first signal including the first portion of the optical signal comprises between 75% and 90% of the optical signal.

6. The system of claim 1, further comprising at least one of a grating coupler, a spot size converter, and a polarization splitter coupled between an optical fiber and the directional coupler.

7. The system of claim 1, wherein:
   the first signal path further includes a first silicon nitride (SiN)-silicon (Si) multimode adiabatic coupler between a first output port of the directional coupler and the first photodetector of the first signal path; and the second signal path further includes a second SiN—Si multimode adiabatic coupler between a second output port of the directional coupler and the second photodetector of the second signal path.

8. The system of claim 7, further comprising:
a Si substrate;
a buried oxide (BOX) layer formed above the Si substrate;
a Si waveguide layer formed above the BOX layer; and
a silicon nitride (SiN) waveguide layer formed above the Si waveguide layer, wherein:
the directional coupler is formed in the SiN waveguide layer;
each of the first and second SiN—Si multimode adiabatic couplers is formed in the Si waveguide layer and the SiN waveguide layer and includes:
a multimode Si waveguide formed in the Si waveguide layer, the Si waveguide including a Si taper; and
a SiN waveguide formed in the SiN waveguide layer, the SiN waveguide including a SiN taper aligned in two orthogonal directions with a portion of the multimode Si waveguide that is continuous with and excludes the Si taper, the Si taper being aligned in two orthogonal directions with a portion of the SiN waveguide that is continuous with and excludes the SiN taper.

9. An optical receiver, comprising:
at least one directional coupler having at least one input configured to couple to an optical fiber;
a first signal path including a first photodetector coupled to an output of the at least one directional coupler, a first transimpedance amplifier (TIA) including an input coupled to the first photodetector, and an adder coupled to an output of the first TIA;
a second signal path including a second photodetector coupled to an output of the at least one directional coupler, a second TIA including an input coupled to the second photodetector, and the adder coupled to an output of the second TIA; and
an optical power sensing circuit coupled to at least one of the first TIA, the second TIA, the adder, and an output of the optical receiver and configured to detect a signal power level within the first signal path, within the second signal path, at the adder, or at the output of the optical receiver,
wherein the optical receiver is configured to:
enable the first TIA and disable the second TIA when the signal power level is within a first range of signal power levels; and
enable the second TIA and disable the first TIA when the signal power level is within a second range of signal power levels that does not overlap with the first range of signal power level.

10. The optical receiver of claim 9, wherein the optical receiver is configured to:
enable the first TIA and disable the second TIA when the signal power level is equal to or less than a threshold value, the first range of signal power levels including signal power levels including and below the threshold value; and
disable the first TIA and enable the second TIA when the signal power level is greater than the threshold value, the second range of signal power levels including signal power levels above the threshold value.

11. The optical receiver of claim 9, wherein the optical receiver is configured to:
enable the first TIA and distable the second TIA when the signal power is less than a first threshold value, the first range of signal power levels including signal power levels below the first threshold value;
disable the first TIA and enable the second TIA when the signal power level is greater than a second threshold value, wherein the second threshold value is greater than the first threshold value, the second rage of signal power levels including signal power levels above the second threshold value; and
enable each of the first IA and the second TIA when the signal power level is between the first threshold value and the second threshold value.

12. The optical receiver of claim 9, wherein the first signal path is configured to receive a first percentage of an input signal and the second signal path is configured to receive a second, different percentage of the input signal, wherein the first percentage comprises X percent of the input signal and the second, different percentage comprises 100-X percent of the input signal.

13. The optical receiver of claim 9, further comprising at least one of a grating coupler, a spot size converter, and a polarization splitter coupled to an input of the at least one directional coupler.

14. The optical receiver of claim 9, wherein:
the directional coupler comprises an 80/20 silicon nitride (SiN) polarization independent directional coupler;
the optical receiver further comprises a first SiN-silicon (Si) multimode adiabatic coupler that optically couples a first output port of the 80/20 SiN polarization independent directional coupler to the first photodetector of the first signal path; and
the optical receiver further comprises a second SiN—Si multimode adiabatic coupler that optically couples a second output port of the 80/20 SiN polarization independent directional coupler to the second photodetector of the second signal path.

15. The optical receiver of claim 9, wherein:
the first signal path further includes a first silicon nitride (SiN)-silicon (Si) multimode adiabatic coupler between a first output port of the directional coupler and the first photodetector of the first signal path; and
the second signal path further includes a second SiN—Si multimode adiabatic coupler between a second output port of the directional coupler and the second photodetector of the second signal path.

16. A method, comprising:
splitting an optical signal into a first optical signal and a second optical signal via a directional coupler, the first optical signal including a first portion of the optical signal and the second optical signal including a second, lesser portion of the optical signal;
converting the first optical signal into a first current signal in a first signal path;
converting the second optical signal into a second current signal in a second signal path;
amplifying the first current signal to generate a first amplified signal in the first signal path;
directly or indirectly detecting a power level of the optical signal; and
disabling a first transimpedance amplifier (TIA) in the first signal path and enabling a second TIA in the second signal path in response to the power level of the optical signal increasing above a threshold value.

17. The method of claim 16, further comprising receiving the optical signal at the directional coupler from an optical fiber.

18. The method of claim 16, wherein directly or indirectly detecting the power level of the optical signal comprises directly detecting average photodiode current in at least one of:
- a first photodetector that converts the first optical signal into the first current signal;
- a first transimpedance amplifier (TIA) coupled to receive the first current signal from the first photodetector;
- a second photodetector that converts the second optical signal into the second current signal; and
- a second TIA coupled to receive the second current signal from the second photodetector.

19. The method of claim 16, wherein directly or indirectly detecting the power level of the optical signal comprises indirectly detecting the power level of the optical signal by detecting amplitude or power of an electrical signal at an output of an interpolator/adder coupled to both the first signal path and the second signal path.

* * * * *